United States Patent [19]

D'Alessandro, deceased et al.

[11] 3,959,512

[45] May 25, 1976

[54] EDIBLE HYPERPROTEINIC DIETETIC PASTE OF HIGH BIOLOGICAL VALUE

[76] Inventors: Salvatore D'Alessandro, deceased, late of Mormanno (Cosenza), Italy; by Francesco Carlo D'Alessandro, heir, Mormanno (Cosenza), Italy; by Annunziata D'Alessandro, heir, Mormanno (Cosenza), Italy; by Sandro D'Alessandro, heir, Mormanno (Cosenza), Italy

[22] Filed: Aug. 1, 1975

[21] Appl. No.: 601,069

Related U.S. Application Data

[63] Continuation-in-part of Ser. No. 483,696, June 27, 1974, abandoned, which is a continuation of Ser. No. 361,644, May 18, 1973, abandoned, which is a continuation-in-part of Ser. No. 86,932, Nov. 4, 1970, abandoned.

[30] Foreign Application Priority Data

Nov. 7, 1969  Italy .................................. 24043/69

[52] U.S. Cl. ................................................ 426/557
[51] Int. Cl.$^2$ .......................................... A23L 1/16
[58] Field of Search .................................... 426/557

[56] References Cited

UNITED STATES PATENTS 2,819,969  1/1958  Grandel ............................. 426/557
3,214,275  10/1965  Kende et al. ....................... 426/557

*Primary Examiner*—James R. Hoffman
*Attorney, Agent, or Firm*—Ernest G. Montague; Karl F. Ross; Herbert Dubno

[57] ABSTRACT

A protein-rich dietetic pasta is produced by mixing wheat flour, proteins and soluble caseinogen, kneading the mixture while wetting it with the addition of whole or skimmed milk, and drying the product.

10 Claims, 1 Drawing Figure

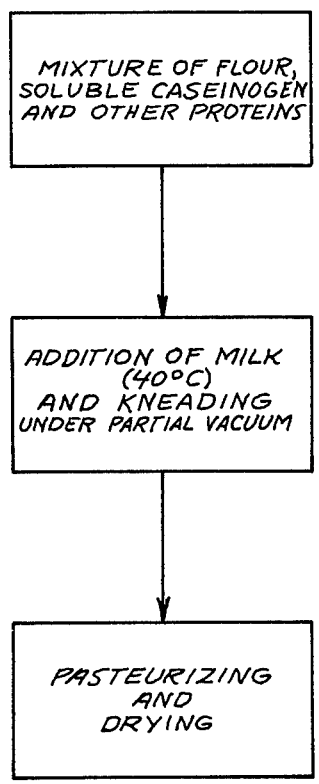

EDIBLE HYPERPROTEINIC DIETETIC PASTE OF HIGH BIOLOGICAL VALUE

This application is a continuation-in-part of copending application Ser. No. 483,696 filed June 27, 1974 as a continuation of application Ser. No. 361,644 which in turn has been filed on May 18, 1973 as a continuation-in-part of application Ser. No. 86,932 filed Nov. 4, 1970, all now abandoned.

The present invention relates to a pasta, i.e., a dough suitable for slicing into spaghetti, vermicelli or the like, and a process for making same.

The object of this invention is to provide a pasta, particularly for dietetic purposes, which is rich in proteins and has better nutritive and organoleptic qualities than ordinary pastas known in the art.

In accordance with the present invention, flour is homogeneously mixed with proteins including soluble caseinogen, such as sodium caseinate, which acts as a binder for the other ingredients and improves the appearance and taste of the ultimate product while also increasing its rate of expansion on cooking and resisting its tendency to become lumpy or sticky. This mixture is then thoroughly kneaded with the addition of milk (whole or preferably skimmed) as an exclusive wetting agent, advantageously in the presence of a partial vacuum and with the milk held at an elevated temperature. The resultant product is then dried, generally under pasteurizing conditions, to form a nutritive and highly palatable article of food.

The flour preferred for the pasta according to this invention is wheat flour of the type Triticum Durum or Triticum Vulgare, ground to any desired degree of fineness.

Especially when skimmed milk is used, the proteins in the mixture should be so chosen as to supplement those of the milk such as glutenin, gliadin, lactalbumin and lactoglobulin in supplying essential amino acids. The addition of lactalbumin, in particular, is highly useful; so are vegetable proteins such as wheat gluten and soybean protein which may be present in substantially equal quantities by weight. In general, the proportion of caseinogen (in percent by weight) should be less than that of the vegetable proteins and more than that of the supplemental lactalbumin. It further improves the taste and digestibility of the product if some of the aforestated proteins, possibly including the caseinogen, are present in hydrolyzed form.

The total amount of proteins in the original mixture preferably ranges between about 5% and 20%, by weight, of the flour. With the addition of milk during the kneading step at a rate of approximately one-fourth of the combined weight of flour and proteins, the weight proportions of the final product will be substantially as follows:

| Wheat flour | 75% to 90% |
|---|---|
| milk | 5% to 7% |
| balance proteins, with the caseinogen ranging between 2% and 5% of the total. | |

The process according to the invention has been illustrated schematically in the sole FIGURE of the accompanying drawing, showing as a first step the preparation of a mixture of flour, soluble caseinogen and other, enriching proteins. After thorough homogenization, the mixture is wetted with milk (preferably skimmed) at 40°C and kneaded or masticated under a partial vacuum which helps impart a distinct brilliance and pearly transparency to the product. This kneading step can be performed continuously with the aid of a conveyor advancing the homogenized mixture between pressure rollers in a vacuum chamber to which the milk is delivered at the requisite rate. The final mixture is then heated to a pasteurizing temperature until substantially dry.

EXAMPLE

| Ingredients | | Percent by Weight In Wet Mixture | In Dry Mixture |
|---|---|---|---|
| Wheat flour | | 67 | 81 |
| unhydrolyzed proteins | wheat gluten | 2.5 | 3 |
| | soybean protein | 2.5 | 3 |
| | sodium caseinate | 3 | 4 |
| | lactalbumin | 1 | 1.5 |
| hydrolyzed proteins | as above | 1 | 1.5 |
| skimmed milk | | 23 | 6 |

The proportions of the proteins may vary in the final product within the following ranges (by weight):

| vegetable proteins | 2% to 8% |
|---|---|
| caseinogen | 1.5% to 6% |
| lactalbumin | 1% to 3.5% |

With partial hydrolysis, the total proportion of hydrolyzed proteins may range between 0.5% and 2.5%.

Thanks to the above-disclosed combination of enriching proteins, the pasta according to the invention has a high lysine content and is low in carbohydrates.

What is claimed:

1. A process for making a dietetic pasta, comprising the steps of:
   homogeneously mixing flour with proteins including soluble caseinogen;
   kneading the mixture with the addition of milk as an exclusive wetting agent; and
   drying the kneaded mixture.

2. A process as defined in claim 1 wherein the milk is added at an elevated temperature.

3. A process as defined in claim 1 wherein the kneading proceeds under a partial vacuum.

4. A process as defined in claim 1 wherein the drying is carried out at pasteurizing temperatures.

5. A process as defined in claim 1 wherein said proteins are partly hydrolyzed.

6. A process as defined in claim 1 wherein said proteins include lactalbumin and vegetable proteins.

7. A process as defined in claim 6 wherein the milk is skimmed milk and the flour is wheat flour.

8. A process as defined in claim 7 wherein the milk is added to the mixture during the kneading step at a rate of approximately one-fourth of the combined weight of flour and proteins, the proportion of said proteins ranging between about 5% and 15% by weight of the total, the percentage of caseinogen being between less than that of the vegetable proteins but more than that of the lactalbumin.

9. A dietetic pasta consisting essentially of a homogeneous mixture of the following ingredients:

| wheat flour | 75% to 90% by weight |
|---|---|
| milk solids | 5% to 7% by weight |
| balance proteins including caseinogen in an | | amount ranging between 1.5% and 6% by weight.

10. A dietetic pasta as defined in claim 9 wherein said proteins further include vegetable proteins in a percentage exceeding that of the caseinogen and lactalbumin in a percentage less than that of the caseinogen.

* * * * *